(12) United States Patent
Anaparthi et al.

(10) Patent No.: US 11,908,000 B2
(45) Date of Patent: Feb. 20, 2024

(54) ALLOCATION MECHANISM IN CONSIGNMENT PROCESSING

(71) Applicant: SAP SE, Walldorf (DE)

(72) Inventors: V Krishna Anaparthi, Bangalore (IN); Iris Zimmermann, Speyer (DE); Uday Kamte, Bangalore (IN); Suanka Srivastava, Bangalore (IN)

(73) Assignee: SAP SE, Walldorf (DE)

( * ) Notice: Subject to any disclaimer, the term of this patent is extended or adjusted under 35 U.S.C. 154(b) by 46 days.

(21) Appl. No.: 17/687,320

(22) Filed: Mar. 4, 2022

(65) Prior Publication Data
US 2023/0281698 A1    Sep. 7, 2023

(51) Int. Cl.
*G06Q 30/00* (2023.01)
*G06Q 30/0601* (2023.01)

(52) U.S. Cl.
CPC ..... *G06Q 30/0637* (2013.01); *G06Q 30/0605* (2013.01); *G06Q 30/0611* (2013.01); *G06Q 30/0643* (2013.01)

(58) Field of Classification Search
CPC .................................................... G06Q 30/00
See application file for complete search history.

(56) References Cited

U.S. PATENT DOCUMENTS

| 2016/0092829 A1* | 3/2016 | Jones | G06Q 10/087 |
| | | | 705/28 |
| 2023/0196323 A1* | 6/2023 | Crystal | G06Q 20/18 |
| | | | 705/20 |

OTHER PUBLICATIONS

Babu, Vignesh, "How Vendor Consignment Works in D365 for Finance & Operations", Hitachi Solutions, dated Mar. 19, 2019. (Year: 2019).*

* cited by examiner

*Primary Examiner* — Mark A Fadok
(74) *Attorney, Agent, or Firm* — SCHWEGMAN LUNDBERG & WOESSNER, P.A.

(57) ABSTRACT

In an example embodiment, when a user creates a consignment issue item for a given product in a sales order, the system will reserve/temporarily allocate the available quantity in consignment stock. A synchronous call to lock the inventor makes a tentative update to the inventory stock on the quantity required for the request product on the created issue item. This update is tentative because the locked quantity should be released if the user decides not to save the document, but it also should be locked so that it is not available to another user who is also trying to create an issue item in a different sales order document for the same product in a parallel session. The allocation may also change several times before saving the document by additional synchronous calls that again update the tentative allocations. When the user finally decides the final state of the issue item, it asynchronously sends either a confirmation or compensate message based on whether the document was saved or not saved.

20 Claims, 6 Drawing Sheets

ALLOCATION MECHANISM IN CONSIGNMENT PROCESSING

TECHNICAL FIELD

This document generally relates to technical problems with consignment processing in a computer system. More specifically, this document relates to the use of an allocation mechanism for consignment processing.

BACKGROUND

A consignment process is an arrangement in which a goods provider provides goods to a goods receiver prior to the goods receiver having any legal obligation to purchase the goods. In the case where a goods provider is a seller, for example, and the goods receiver is a buyer, this may mean that the seller sends a certain quantity of goods to the buyer, which the buyer then stores at the buyer's location. While the goods are in storage, however, there is not yet an obligation for the buyer to actually purchase any of the goods, until the buyer decides to remove them from consignment stock. Any goods not removed from consignment stock may be returned without requiring the goods to have been invoiced.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
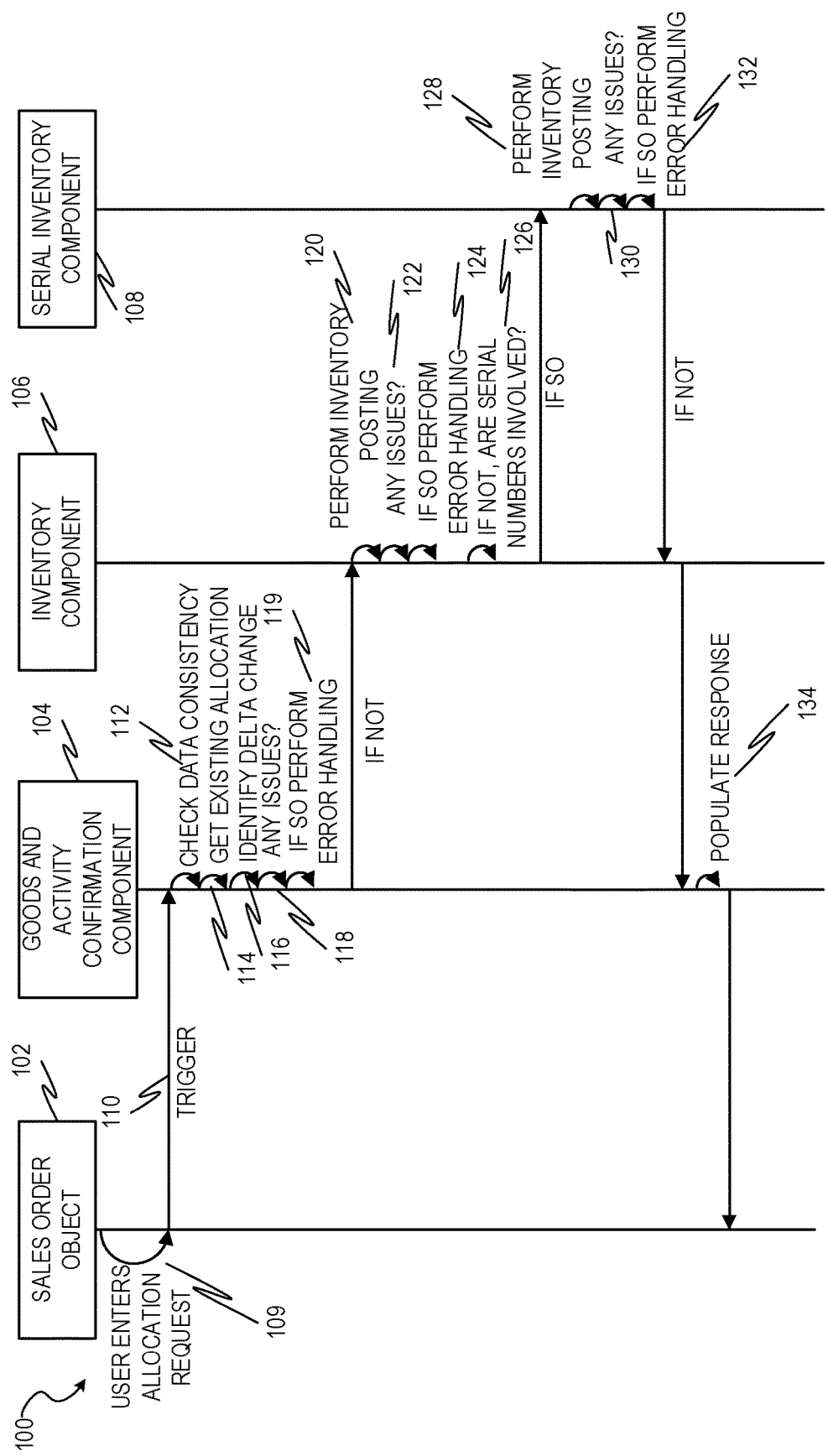
FIG. 1 is an activity diagram illustrating a method for operating a computer system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

At a technical level, consignment relationships are often managed via computer systems, which manage two different documents for each transaction: a consignment fill-up document and a consignment issue document. The consignment fill-up document is processed at the time the goods provider agrees to send the goods to the goods receiver, while the consignment issue document is processed at the time the goods receiver agrees to purchase goods from the consignment stock. There are technical problems, however, that occur in the processing of consignment issue documents.

Consignment issue documents are often created by adding sales order items to a consignment issue document. For each sales order item, the user creates one or more allocation requests. When a user completes the allocation requests, the sales order item may be finalized, at which point the consignment issue document may also be finalized and processed. Processing a consignment issue document involves the computer system reviewing all the allocation requests within the consignment issue document and allocating (e.g., permanently assigning) the appropriate inventory from the consignment stock to the goods receiver.

One technical issue that arises is that it is possible using such computer systems for duplicate provision of inventory to occur, such as in the case of consignment allocation to multiple requesters. Thus, for example, if two users begin creating sales order items around the same time, it is possible for them both to request inventory in an amount that appears to them to be "in-stock" in the consignment stock, but then if the requested inventory is allocated to both sales order items, there is not enough stock in the consignment stock to actually fulfil the sale order items. In an example embodiment, a computer system is provided that ensures that duplicate provision of inventory is not possible by locking and allocating inventory in real time, as well as unlocking the allocated inventory if a user decides not to pursue the consignment issue process (such as by not saving the sales order item document, despite having locked the inventory needed to satisfy the request).

Another technical issue that arises is that there may be a time gap between when the user creates an allocation request in a sales order and when the user eventually finalizes the sales order. Finalizing the sales order often involves saving it. This creates an issue regarding managing work efficiently as a user might be incentivized to finalize sales orders too quickly (e.g., before they are sure they are correct, or before they have finished inputting all of their allocation requests) to avoid losing out on inventory.

Solving these problems can be complex as the process at the computer-system level involves several different development units and objects with synchronous or asynchronous message exchange. This means that an error at the last involved object does not necessarily get to the user immediately, but only later when they notice unposted documents.

In an example embodiment, when a user creates a consignment issue item for a given product in a sales order, the system will reserve/temporarily allocate the available quantity in consignment stock. A synchronous call to lock the inventory makes a tentative update to the inventory stock on the quantity required for the request product on the created issue item. This update is tentative because the locked quantity should be released if the user decides not to save the document, but it also should be locked so that it is not available to another user who is also trying to create an issue item in a different sales order document for the same product in a parallel session. The allocation may also change several times before saving the document by additional synchronous calls that again update the tentative allocations. When the user finally decides the final state of the issue item, the system asynchronously sends either a confirmation or compensation message based on whether the document was saved or not saved.

FIG. 1 is an activity diagram illustrating a method 100 for operating a computer system, in accordance with an example embodiment. The method 100 includes four components/objects. A sales order object 102 is an object in which users enter allocation requests. A goods and activity confirmation component 104 processes the allocation requests. An inventory component 106 manages inventory. An optional serial inventory component 108 manages inventory at a more granular level than the inventory component 106. More particularly, inventory component 106 tracks overall inventory numbers for products but does not manage individual inventory units. Thus, for example, inventory component 106 may track that there are 343 units of a particular product in consignment stock, but does not track individual units of that product in the consignment stock. If a serial number or other unit-level information is available about the units, then a separate serial inventory component 108 may track the individual units, based on their respective serial numbers. This allows, for example, particular units of a product to be assigned to a particular user.

At operation 109, a user enters an allocation request in the sales order object 102. At operation 110, this triggers the goods and activity confirmation component 104 to perform three operations. Specifically, at operation 112, the goods and activity confirmation component 104 checks data consistency of the sales order object 102. This involves verifying that none of the data input in the sales order is inconsistent with itself, such as by entering invalid values for fields. At operation 114 the goods and activity confirmation component 104 gets the existing allocation for the product (e.g., how much of the available inventory has been allocated). At operation 116, the goods and activity confirmation component 104 identifies the delta change in inventory for a product which has been requested in the sales order object 102. Delta change is the net amount of inventory requested for the product in the sales order object 102. This means that if, for example, the sales order object 102 contains more than one allocation request for a particular product, that the goods and activity confirmation component 104 will determine the total amount requested for all the allocation requests.

At operation 118, the goods and activity confirmation component 104 determines if there are any issues with processing the allocation request. Issues may include inconsistent data (as evaluated in operation 112) or insufficient unallocated inventory. If any issues arise, then at operation 119 error handling may be performed. If not, then at operation 120 the inventory component 106 performs inventory posting for the allocation request. This includes locking, reserving, or otherwise temporarily allocating the delta change in inventory to the sales order 102. At operation 122, it is determined if there were any issues with the performing of inventory posting. If so, then at operation 124 error handling may be performed. If not, then at operation 126 it is determined if serial numbers are involved in the sales order 102. If so, then at operation 128, the serial inventory component 108 performs serial inventory posting. This includes locking, reserving, or otherwise temporarily allocating the delta change in inventory at the serial number level. At operation 130, it is determined if there were any issues with the performing of serial inventory posting. If so, then at operation 132 error handling is performed.

At operation 134, a response to the allocation request is populated, based on the results received from the inventory component 106 (as well as from the error handling of operation 118, if applicable). This response may include, for example, an indication that the requested inventory has been temporarily allocated, or an indication that it has not due to some error.

An object in this context is a structural model that stores transactional data related to the entity that it represents. In an example embodiment, examples include Sales Order and GoodsAndActivityConfirmation. A process component is a software package that realizes a process and generally exposes its functionality as a service. The functionality contains transactions. In other words, a process component can be defined as a collection of different objects that are semantically related to each other. In an example embodiment, examples include SalesOrderProcessing and InventoryProcessing. To allow flexible activation and deactivation of certain functional application areas by the user, semantically related process components may be grouped together as deployment units. Different deployment units can be operated on separate systems independently of one another, or alternative can be operated on the same system. Objects in different deployment units communicate via process agents and messages, regardless of whether they are running on the same system or not. This results in a set of very flexible deployment options, as multiple deployment units can be distributed across multiple systems. In an example embodiment, examples include CustomerRelationshipManagement and ProductionAndSiteLogisticsExecution.

A process agent either creates and sends a message to or receives a message from a process component in another deployment unit. When a process involves process components in separate deployment units, process agents are used to share the information needed to trigger or perform processes. Process agent documentation describes the context in which a process agent is used, its interaction with other entities, and the process step that is achieved as a result of this interaction. A process agent handles either outbound or inbound message communication.

An asynchronous process agent sends or receives a request message to either create or update an instance of an object in another process component or in its own process component. The agent, once triggered, does not wait for a response. A synchronous outbound process agent sends a message to a synchronous inbound process agent in another process component and then waits for a response. Depending on the required process step, this message is either a query or a request message. If the process agent requires the receiving inbound process agent to retrieve information from an object, it sends a query and waits for a response message containing that information; if the process step requires that the inbound process agent change or create an instance of a business object, it sends a request message and receives a confirmation message back. In either case, the object remains locked against further changes until the message is received. If the process agent sends a request action, the sending and receiving process agents follow a "Tentative Update & Confirm/Compensate (TU&C/C) protocol".

The TU&C/C protocol demands a contract to be observed by the communication partners:
  The consumer promises to send either a confirmation or a compensate message once its local transaction has ended, no matter how it has ended; this includes not only explicit commits or roll-backs but also any kind of failure that aborts the transaction, including a system crash.
  The consumer can rely on the remote component to bring the remote transaction to the same end as the local transaction at the local component.

All the consumer needs to do is to send a confirm message transaction message with the commit of its local transaction, or send a compensate message if the local transaction fails.

The provider promises to convert the tentative updates into permanent updates when it receives a confirm message and to undo the tentative updates when it receives a compensate message, no matter what happens to the remote component in the meantime; this again includes fatal errors like a system crash. This applies to all updates performed in the remote component including entries added to the process integration persistence of the remote component. If no tentative updates have been made, the compensate message is ignored.

The provider can rely on the consumer to inform it about the success of its local transaction and must not take any actions on the tentative updates until notified to do so. In particular, it does not set a timeout to automatically undo tentative updates when a certain period of time has elapsed: This would breach the contract on its own side as the remote component promises to convert tentative updates into permanent updates when it receives a confirm message, but it would not be possible if it had deleted the tentative updates.

Figure 2:
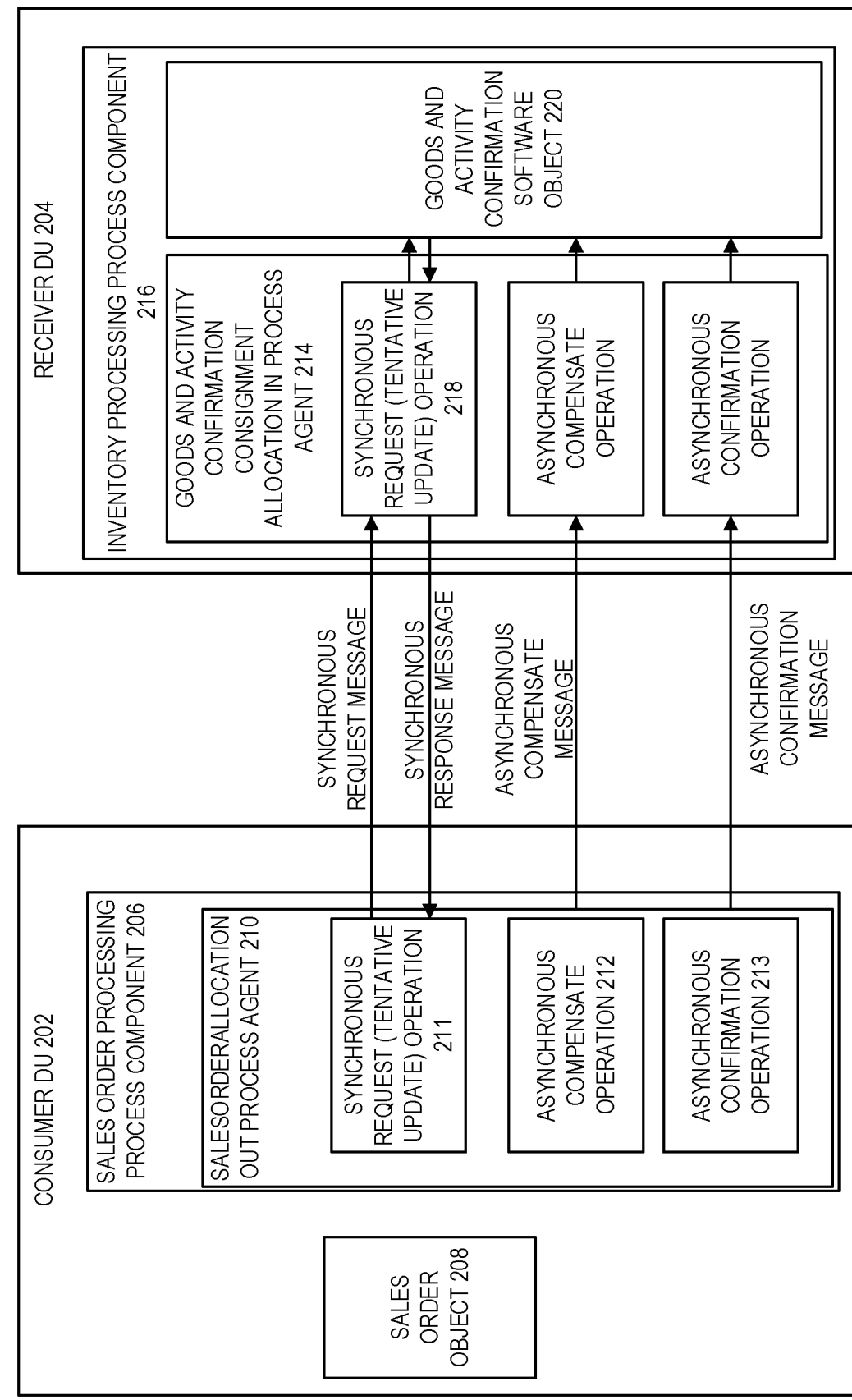
FIG. 2 is a block diagram illustrating a system for managing consignment allocation in a computer system, in accordance with an example embodiment.

FIG. 2 is a block diagram illustrating a system 200 for managing consignment allocation in a computer system, in accordance with an example embodiment. The system 200 includes a consumer DU 202 and a receiver DU 204. The consumer DU 202 includes a sales order processing process component 206. When a sales order object 208 is processed, the sales order processing process component 206 determines whether to perform a synchronous outbound process or an asynchronous outbound process. This determination is based on the actions taken by the user in the sales order object 208. If the sales order object 208 has been modified to add an allocation request, then a salesorderallocationout process agent 210 calls a synchronous request (tentative update) operation 211, whereas if the sales order object 208 has been saved, or not saved by closing the screen, then the asynchronous outbound process 213 should be called.

The synchronous request (tentative update) operation 211 creates a synchronous request for a tentative update. In response, a synchronous request message is sent to a goods and activity confirmation consignment allocation in process agent 214 located in an inventory processing process component 216 on the receiver DU 204, which then performs the necessary inventory checks and locking (if possible) using a goods and activity confirmation software object 220, and sends back a synchronous response message using its own synchronous request (tentative update) operation 218.

When the salesorderobject 208 is closed or an explicit cancellation or modification of the consignment request is made, the salesorderallocationout process agent 210 calls either an asynchronous compensate operation 212 (in the case that the sales order object was closed without saving or the consignment request was cancelled explicitly), or an asynchronous confirmation operation 213 (in the case that the sales order object was confirmed by the user). In each of these cases, a corresponding message is sent to the goods and activity confirmation consignment allocation in object 214 for handling, without the need for any return message.

The above processes avoid false positives while processing consignment issue orders. The false positives would result in the order item being posted without the inventory having the necessary stock to fulfil it. To achieve this, the synchronous message sent to the receiver DU 204 is termed a temporary update. This synchronous information is temporary and needs to be backed up by either a confirmation message (which confirms the temporary update) or a compensate message (which requests cancellation/nullification of the temporary update). The one entity that links the synchronous message with the asynchronous message is the session identification. The session identification is maintained across the transaction. This session identification may be maintained on the confirmation documents created, which in turn update the inventory object. The session identification also helps identify the confirmations that need to be reversed if the compensate message is received due to the order not being saved. The sales order item reference may also be stored on the confirmation document, which aids in querying and aggregating data that is used for data comparison between different temporary request and a confirmation request.

Assume, for example, that a consignee informed a consignor that they have consumed:
  4 EA of material PRODUCT
  3 EA from batch 'Batch_01' of stock of material BATCH_PRODUCT
  2 serial numbers (S001 & S002) of material SERIAL_PRODUCT The consignee then creates an issue order, and the user performs the allocation.

Assume there is a need to capture the fact that the sales order allocation status changes when the allocation-relevant field values are changed (Material, Identified stock, serial number, Ship-from, quantity). At this point, assume there is an update from Consignee (CP100110) to consignor (1000000) that there is a mistake earlier and the correct information is as below.
  3 EA of material PRODUCT (implying reduction of 1 EA from earlier communication)
  4 EA from batch 'Batch_01' of stock of material BATCH_PRODUCT (implying increase of 1 EA from earlier communication)
  2 serial numbers (S003 & S004) of material SERIAL_PRODUCT (implying change of serial numbers, even when the quantity remained same)

The consignor then modifies the same items in order, and retriggers allocation. The goods allocation is successfully updated. The stock situation would then reflect the order situation, with respective order references.

The user can still trigger an additional allocation request where, for example, the user increases the allocation quantity on the order through another temporary update, which is part of the same transaction.

The delta can be identified by querying and aggregating the goods and activity confirmations with the same sales order item reference, aggregating them and using this information to identify the delta and apply those changes to the inventory BO, and to the serial inventory if the serial numbers are involved.

The result of the fresh allocation request will be sent back to the sales order.

Now, upon saving the sales order, when then the asynchronous confirmation is posted, no delta identified and the stock will continue to be tagged to the sales order item(s).

In the negative quantity change situation, if the requested quantity is less than the allocated quantity, GAC is not posted for this request. That is because this is a temporary update, and if a GAC is posted that reduces the allocated quantity and the user cancels the transaction, the posted GAC would have to be reversed. However, there is a chance of the released quantity being tagged to another order by the time the compensate message is received and processed. Hence, no GAC is posted, and instead in the allocation response the allocated quantity is sent as the one requested by the temporary update.

Now, when the user saves the order, the confirmation message is sent to GAC with this reduced quantity. Since this is now known not to be a temporary update, a GAC is posted for the difference between the allocated quantity and the requested quantity and the inventory and serial inventory are updated. If all the updates are successful, the asynchronous message is successful, and the allocated quantity is reduced. The consignor would then release the order. After release of the order, the allocated stock would be reduced from inventory. The release of the outbound delivery (OD) for the consignment issue item is allowed only if its corresponding sales order item has been successfully allocated. The allocation status and quantity information are communicated from sales order to outbound delivery with an A2A message. The cardinality of sales order item and OD item is 1:1. Upon OD release, the inventory cant be seen. It will be removed. Before SO issue item is ordered, but has allocation, then the inventory will showcase the allocated quantity against the SO item.

When the release action of the OD is triggered, the allocated stock is removed from the inventory and serial inventory with the help of the sales order item reference. Once the OD is released and the quantity is reduced from the inventory and serial inventory, the consignment issue item can be invoiced.

In continuation with above example, assume there is a new information from consignee (CP100110) to consignor (1000000) as follows:

3 EA of material PRODUCT got consumed

Consignor creates the order and triggers allocation. Assume the consignor has not yet saved the order, implying that the order number is not yet generated. As the order reference number is not there, the system would capture the allocation against temporary reference Temporary Quantity Allocation (TQA).

At this juncture, assume that the consignor has not saved the order and just closed the screen without saving the order as he wants to cancel the entire transaction. Such action would then automatically deallocate the stock that's allocated against the order.

If the user does not save the sales order, a compensate message is triggered with the transaction ID of the session.

This transaction ID is used to query GACs that were posted during the course of this transaction. The identified GACs are reversed, which results in removal of sales order item tagging against the quantity in the inventory and serial inventory. After this update, the asynchronous message is successfully processed, and the released/deallocated quantity becomes available for fresh allocation to other orders.

Assume there is a new information from consignee (CP100110) to consignor (1000000) as follows:

2 EA of material PRODUCT got consumed

Consignor creates the order and performs allocation. Consignor also saves the order resulting in generation of order ID. Stock would reflect the same. Quantity of 2 EA shall be allocated against the order ID.

Assume, at this junction, the consignee informs that the communication of consumption was sent by mistake and no such consumption happened, implying that the consignor must cancel the order.

Consignor cancels the order. The document gets completed, without any invoicing. This would then release the allocation. The stock would reflect the same.

Post save, the user can request the cancellation of allocation, which is communicated to GAC with a temporary update.

Because this is a temporary update, which can be reversed by not saving the order, no GACs are posted that would reduce the allocation. Instead, the allocation status is sent as unallocated for the order item in the response.

When the user saves the order, a confirmation message is triggered to GAC. The existing GACs posted against the sales order item may be queried and the quantities aggregated. Then the difference between the existing allocated quantity in the inventory that has to be deallocated is identified.

A GAC may then be posted which negates the quantity calculated earlier and this action is applied to the inventory. If there are serial numbers involved, then a similar process occurs with serial inventory.

If the update to the inventory and serial inventory is successful, the previously allocated quantity is removed and the asynchronous message is successfully processed. The released quantity is now available to be tagged against other sales orders.

In another example, it can happen that there will be multiple representatives on the consignor side capturing the consignment issue orders in the system upon updates of consumption from the consignee. If a certain update from the consignee is captured in the system simultaneously by two different people, then the system has controls in place to ensure that the same stock isn't allocated to different orders.

Taking the example forward, assume consignee (CP100110) informed consignor (1000000) that they have consumed:

6 EA of material PRODUCT.

Assume there are 7 EA in consignment stock and hence consignment allocation of 6 EA can be performed.

Assume two consignor users are simultaneously creating the issue order for the same update from the consignee.

The first user created the order and triggered allocation. Assume he or she got the allocation. The stock would reflect the same. Considering the order is not yet saved, the allocation is captured against temporary ID TQA. TQA (Temporary Quantity Allocation) is used to display allocation on inventory for orders that are yet to be saved.

Although the sales order and order item reference are available in the form of UUIDs, the ID for the order is generated only after it is saved—hence the necessity to use the temporary ID. UUIDs are universally unique identifiers in computer systems, typically in the form of 128-bit labels. A second user creates an order and triggers allocation.

The second user would not get the allocation; he or she will get an error stating the free holding stock is just 1 EA for PRODUCT, after having 6 EA allocated.

Hard tagging the inventory with the sales order item during consignment ensures there are no false positives.

If two or more allocation requests are processed in parallel for a limited available quantity, the first request to acquire the allocation would be successful, while the others would get an error signifying the allocation could not take place.

Figure 3:
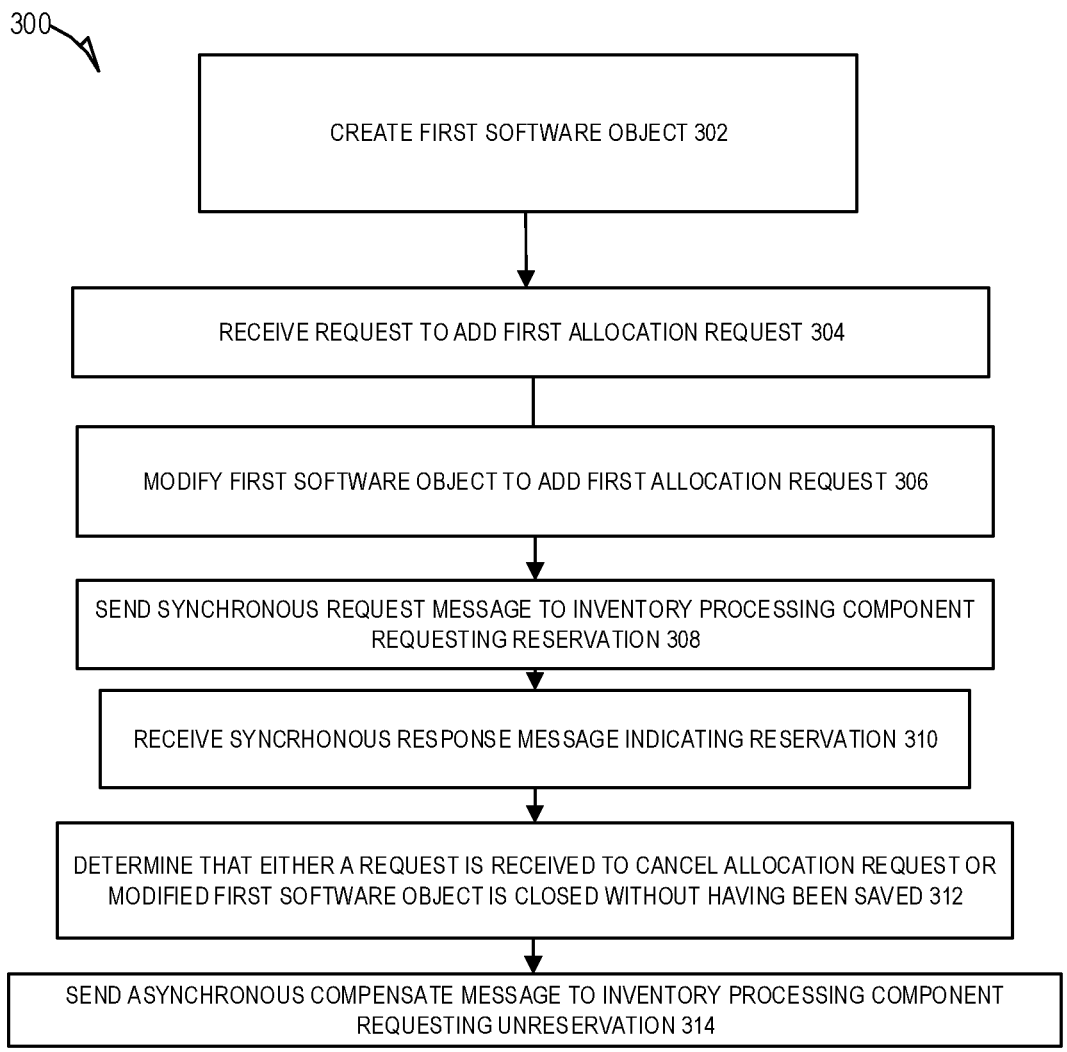
FIG. 3 is a flow diagram illustrating a method of processing an allocation request in a computer system, in accordance with an example embodiment.

FIG. 3 is a flow diagram illustrating a method 300 of processing of an allocation request in a computer system, in accordance with an example embodiment. This figure depicts the flow in the case where a user of a graphical user interface creates a first allocation request, is temporarily allocated stock from the consignment stock in response to the first allocation request, but does not make this temporary allocation permanent, either explicitly or implicitly. This can occur if the user does not save the software object in which the first allocation request was made or if the user explicitly indicates that the first allocation request should be cancelled.

At operation 302, a first software object is created. This first software object may be a sales order object. At operation 304, a request to add a first allocation request to the first software object is received from a graphical user interface. The allocation request requests allocation of a first quantity of a first product from consignment stock. At operation 306, the first software object is modified to add the first allocation request.

At operation 308, a synchronous request message is sent to an inventory processing component requesting the first quantity of the first product be reserved and temporarily removed from available stock in the consignment stock. It should be noted that this synchronous request message is sent prior to the modified first software object being saved. At operation 310, a synchronous response message is received indicating the first quantity of the first product has been reserved. At operation 312, it is determined that either a request is received from the graphical user interface to cancel the allocation request or the modified first software object is closed without having been saved. In response, at operation 314, an asynchronous compensate message is sent to the inventory processing component requesting the first quantity of the first product be unreserved and placed back into available stock in the consignment stock.

Figure 4:
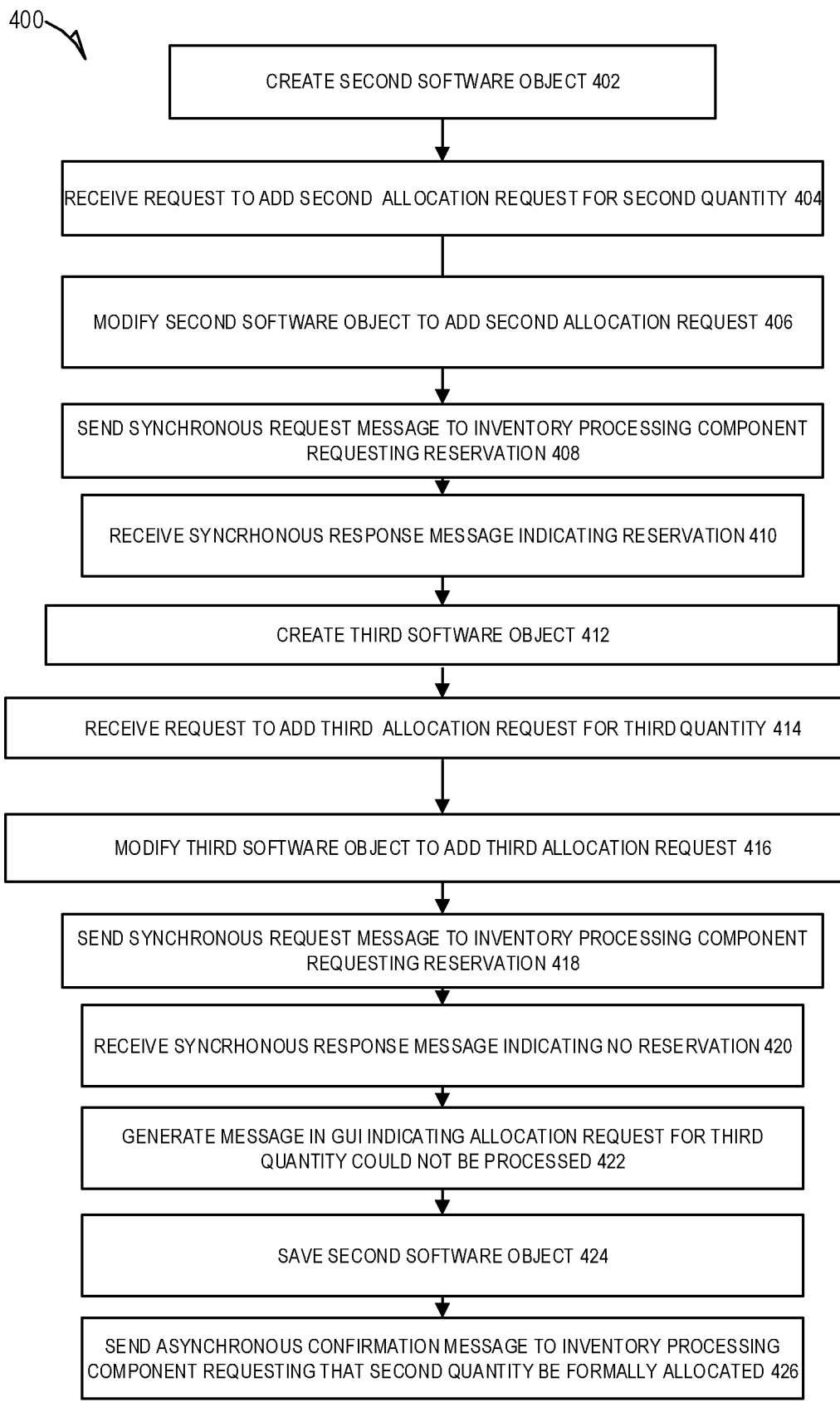
FIG. 4 is a flow diagram illustrating a method of processing an allocation request in a computer system, in accordance with another example embodiment.

FIG. 4 is a flow diagram illustrating a method 400 of processing an allocation request in a computer system, in accordance with another example embodiment. This figure depicts the flow in the case where a first user of a graphical user interface creates a second allocation request, is temporarily allocated stock from the consignment stock in response to the second allocation request, and then later saves the software object containing the second allocation request, making the allocation permanent. This figure further depicts how a second user creates a third allocation request, but is not temporarily allocated stock from the consignment stock in response to the third allocation request due to there not being enough inventory available.

At operation 402, a second software object is created. This second software object may be a sales order object. At operation 404, a request to add a second allocation request to the second software object is received from a graphical user interface. The allocation request requests allocation of a second quantity of a second product from consignment stock. At operation 406, the second software object is modified to add the second allocation request.

At operation 408, a synchronous request message is sent to an inventory processing component requesting the second quantity of the second product be reserved and temporarily removed from available stock in the consignment stock. It should be noted that this synchronous request message is sent prior to the modified second software object being saved. At operation 410, a synchronous response message is received indicating the second quantity of the second product has been reserved.

At operation 412, a third software object is created. This third software object may be a sales order object. At operation 414, a request to add a third allocation request to the third software object is received from a graphical user interface. The allocation request requests allocation of a third quantity of the second product from consignment stock. At operation 416, the third software object is modified to add the third allocation request. At operation 418, prior to saving the modified third software object, a synchronous request message is sent to the inventory processing component requesting the third quantity of the second product be reserved and temporarily removed from available stock in the consignment stock. In this case, however, the inventory processing component determines that there is not enough available inventory, due to the temporary allocation of inventory in response to the second allocation request. As such, at operation 420, a synchronous response message indicating the second quantity of the second product has not been reserved due to insufficient available inventory in the consignment stock is received. At operation 422, a message is generated in the graphical user interface indicating that the allocation request requesting allocation of the third quantity of the second product could not be processed.

At operation 424, the second software object is saved. At operation 426, in response to the second software object being saved, an asynchronous confirmation message is sent to the inventory processing component requesting that the second quantity of the second product be formally allocated and permanently removed from available stock in the consignment stock.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a non-transitory computer-readable medium storing instructions that, when executed by the at least one hardware processor, cause the at least one hardware processor to perform operations comprising:
creating a first software object;
receiving, from a graphical user interface, a request to add a first allocation request to the first software object, the first allocation request requesting allocation of a first quantity of a first product from consignment stock;
modifying the first software object to add the first allocation request;
prior to saving the modified first software object, sending a synchronous request message to an inventory processing component requesting the first quantity of the first product be reserved and temporarily removed from available stock in the consignment stock;
receiving a synchronous response message indicating the first quantity of the first product has been reserved; and
in response to either a request being received from the graphical user interface to cancel the first allocation request or the modified first software object being closed without having been saved, sending an asynchronous compensate message to the inventory processing component requesting the first quantity of the first product be unreserved and placed back into the available stock in the consignment stock.

Example 2. The system of Example 1, wherein the operations further comprise:
creating a second software object;
receiving, from a graphical user interface, a request to add a second allocation request to the second software object, the second allocation request requesting allocation of a second quantity of a second product from the consignment stock;
modifying the second software object to add the second allocation request;
prior to saving the modified second software object, sending a synchronous request message to the inventory processing component requesting the second quantity of the second product be reserved and temporarily removed from the available stock in the consignment stock;

receiving a synchronous response message indicating the second quantity of the second product has been reserved; and in response to the second software object being saved, sending an asynchronous confirmation message to the inventory processing component requesting that the second quantity of the second product be formally allocated and permanently removed from the available stock in the consignment stock.

Example 3. The system of Example 2, wherein the operations further comprise:

creating a third software object;

receiving, from a graphical user interface, a request to add a third allocation request to the third software object, the third allocation request requesting allocation of a third quantity of the second product from the consignment stock;

modifying the third software object to add the third allocation request;

prior to saving the modified third software object, sending a synchronous request message to the inventory processing component requesting the third quantity of the second product be reserved and temporarily removed from the available stock in the consignment stock;

receiving a synchronous response message indicating the third quantity of the second product has not been reserved due to insufficient available inventory in the consignment stock; and generating a message in the graphical user interface indicating that the third allocation request requesting allocation of the third quantity of the second product could not be processed.

Example 4. The system of any of Examples 1-3, wherein the inventory processing component further:

determines whether the first allocation request requests allocation of specific serial numbers of the first product; and in response to a determination that the first allocation request requests allocation of specific serial numbers of the first product, calls a separate serial inventory component to attempt to temporarily reserve the specific serial numbers of the first product.

Example 5. The system of Example 4, wherein the asynchronous compensate message includes a request to unreserve the specific serial numbers of the first product that had been temporarily reserved.

Example 6. The system of any of Examples 1-5, wherein the software object is a sales order object.

Example 7. The system of any of Examples 1-6, wherein the operations are performed at an order processing process component in a consumer deployment unit.

Example 8. A method comprising:

creating a first software object;

receiving, from a graphical user interface, a request to add a first allocation request to the first software object, the first allocation request requesting allocation of a first quantity of a first product from consignment stock;

modifying the first software object to add the first allocation request;

prior to saving the modified first software object, sending a synchronous request message to an inventory processing component requesting the first quantity of the first product be reserved and temporarily removed from available stock in the consignment stock;

receiving a synchronous response message indicating the first quantity of the first product has been reserved; and in response to either a request being received from the graphical user interface to cancel the first allocation request or the modified first software object being closed without having been saved, sending an asynchronous compensate message to the inventory processing component requesting the first quantity of the first product be unreserved and placed back into available stock in the consignment stock.

Example 9. The method of Example 8, further comprising:

creating a second software object;

receiving, from a graphical user interface, a request to add a second allocation request to the second software object, the second allocation request requesting allocation of a second quantity of a second product from the consignment stock;

modifying the second software object to add the second allocation request;

prior to saving the modified second software object, sending a synchronous request message to the inventory processing component requesting the second quantity of the second product be reserved and temporarily removed from the available stock in the consignment stock;

receiving a synchronous response message indicating the second quantity of the second product has been reserved; and in response to the second software object being saved, sending an asynchronous confirmation message to the inventory processing component requesting that the second quantity of the second product be formally allocated and permanently removed from the available stock in the consignment stock.

Example 10. The method of Example 9, further comprising:

creating a third software object;

receiving, from a graphical user interface, a request to add a third allocation request to the third software object, the third allocation request requesting allocation of a third quantity of the second product from the consignment stock;

modifying the third software object to add the third allocation request;

prior to saving the modified third software object, sending a synchronous request message to the inventory processing component requesting the third quantity of the second product be reserved and temporarily removed from the available stock in the consignment stock;

receiving a synchronous response message indicating the third quantity of the second product has not been reserved due to insufficient available inventory in the consignment stock; and generating a message in the graphical user interface indicating that the third allocation request requesting allocation of the third quantity of the second product could not be processed.

Example 11. The method of any of Examples 8-10, wherein the inventory processing component further:

determines whether the first allocation request requests allocation of specific serial numbers of the first product; and in response to a determination that the first allocation request requests allocation of specific serial numbers of the first product, calls a separate serial inventory component to attempt to temporarily reserve the specific serial numbers of the first product.

Example 12. The method of Example 11, wherein the asynchronous compensate message includes a request to unreserve the specific serial numbers of the first product that had been temporarily reserved.

Example 13. The method of any of Examples 8-12, wherein the software object is a sales order object.

Example 14. The method of any of Examples 8-13, wherein the method is performed at an order processing process component in a consumer deployment unit.

Example 15. A non-transitory machine-readable medium storing instructions which, when executed by one or more processors, cause the one or more processors to perform operations comprising:
  creating a first software object;
  receiving, from a graphical user interface, a request to add a first allocation request to the first software object, the first allocation request requesting allocation of a first quantity of a first product from consignment stock;
  modifying the first software object to add the first allocation request;
  prior to saving the modified first software object, sending a synchronous request message to an inventory processing component requesting the first quantity of the first product be reserved and temporarily removed from available stock in the consignment stock;
  receiving a synchronous response message indicating the first quantity of the first product has been reserved; and
  in response to either a request being received from the graphical user interface to cancel the first allocation request or the modified first software object being closed without having been saved, sending an asynchronous compensate message to the inventory processing component requesting the first quantity of the first product be unreserved and placed back into the available stock in the consignment stock.

Example 16. The non-transitory machine-readable medium of Example 15, wherein the operations further comprise:
  creating a second software object;
  receiving, from a graphical user interface, a request to add a second allocation request to the second software object, the second allocation request requesting allocation of a second quantity of a second product from the consignment stock;
  modifying the second software object to add the second allocation request;
  prior to saving the modified second software object, sending a synchronous request message to the inventory processing component requesting the second quantity of the second product be reserved and temporarily removed from available stock in the consignment stock;
  receiving a synchronous response message indicating the second quantity of the second product has been reserved; and
  in response to the second software object being saved, sending an asynchronous confirmation message to the inventory processing component requesting that the second quantity of the second product be formally allocated and permanently removed from the available stock in the consignment stock.

Example 17. The non-transitory machine-readable medium of Example 16, wherein the operations further comprise:
  creating a third software object;
  receiving, from a graphical user interface, a request to add a third allocation request to the third software object, the third allocation request requesting allocation of a third quantity of the second product from consignment stock;
  modifying the third software object to add the third allocation request;
  prior to saving the modified third software object, sending a synchronous request message to the inventory processing component requesting the third quantity of the second product be reserved and temporarily removed from available stock in the consignment stock;
  receiving a synchronous response message indicating the third quantity of the second product has not been reserved due to insufficient available inventory in the consignment stock; and
  generating a message in the graphical user interface indicating that the third allocation request requesting allocation of the third quantity of the second product could not be processed.

Example 18. The non-transitory machine-readable medium of any of Examples 15-17, wherein the inventory processing component further:
  determines whether the first allocation request requests allocation of specific serial numbers of the first product; and
  in response to a determination that the first allocation request requests allocation of specific serial numbers of the first product, calls a separate serial inventory component to attempt to temporarily reserve the specific serial numbers of the first product.

Example 19. The non-transitory machine-readable medium of Example 18, wherein the asynchronous compensate message includes a request to unreserve the specific serial numbers of the first product that had been temporarily reserved.

Example 20. The non-transitory machine-readable medium of any of Examples 15-19, wherein the software object is a sales order object.

Figure 5:
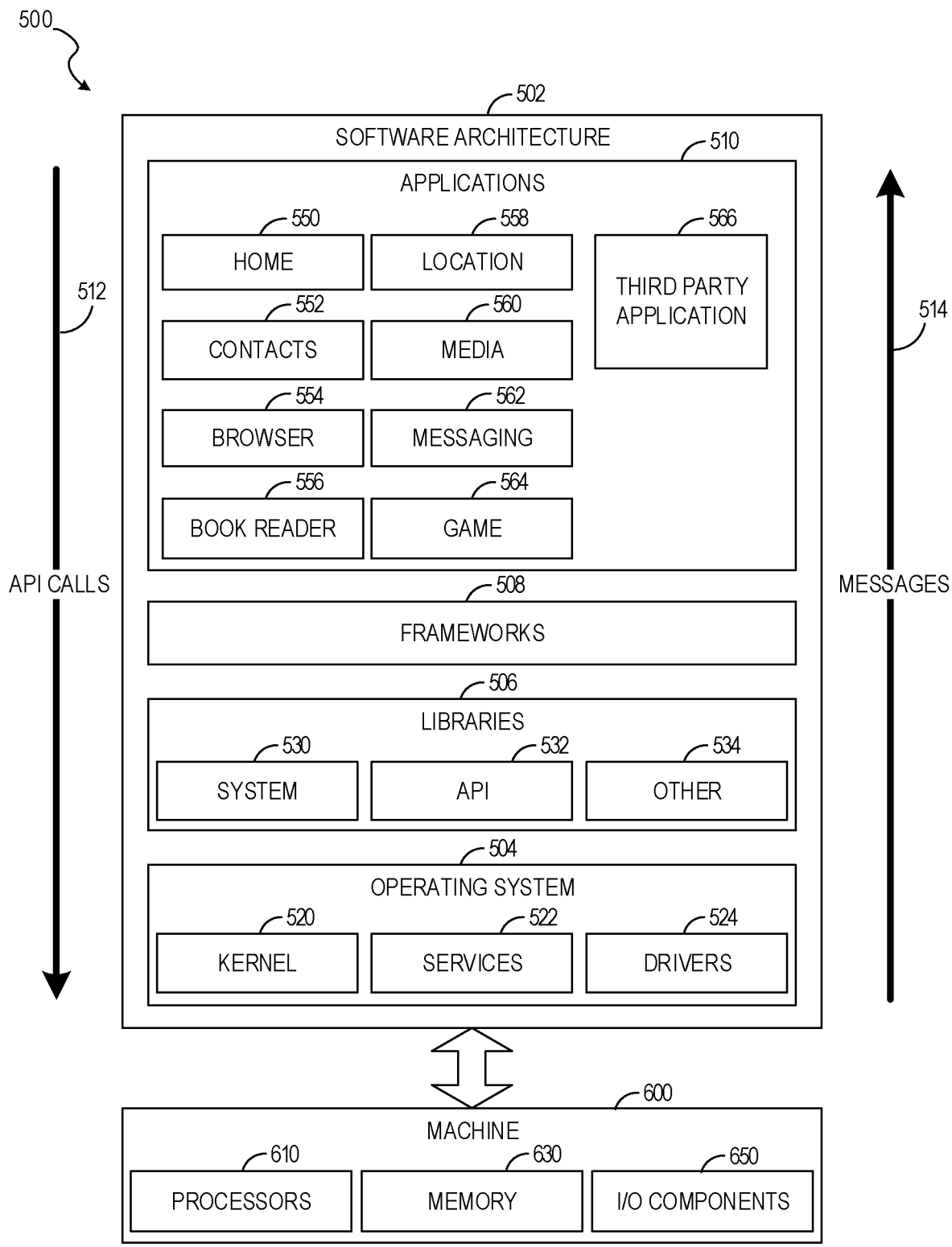
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
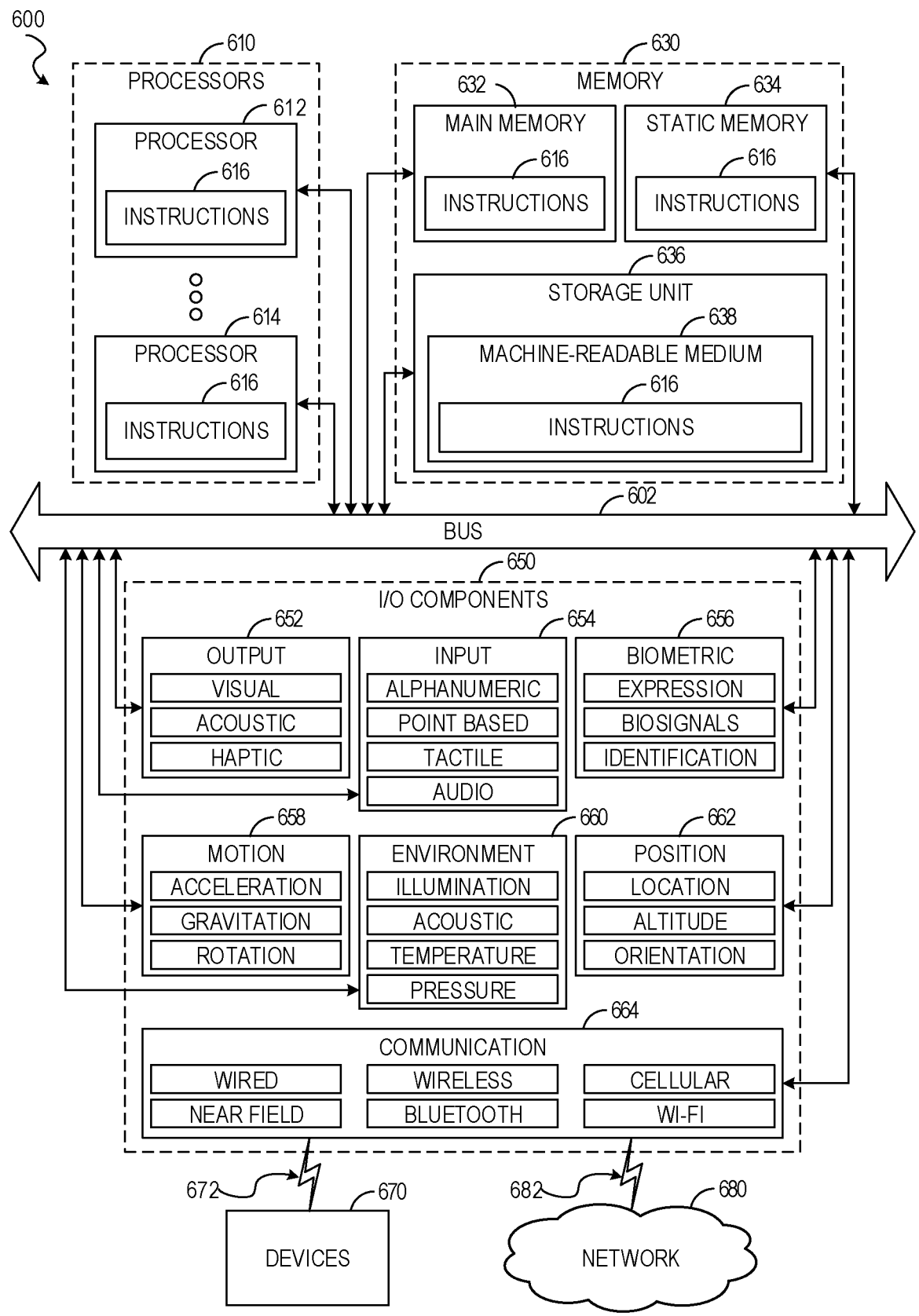
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    at least one hardware processor; and
    a non-transitory computer-readable medium storing instructions that, when executed by the at least one hardware processor, cause the at least one hardware processor to perform operations comprising:
    requesting stock be sent by sending a consignment fill-up document to a stock provider, the stock becoming consignment stock when sent from the stock provider to a stock receiver;
    creating a first software object;
    receiving, from a graphical user interface, a request to add a first allocation request to the first software object, the allocation request requesting allocation of a first quantity of a first product from consignment stock;
    modifying the first software object to reflect the first allocation request, in response to detection of the request from the graphical user interface;
    prior to saving the modified first software object, sending a synchronous request message to an inventory processing component requesting the first quantity of the first product be reserved and temporarily removed from available stock in the consignment stock;
    receiving a synchronous response message indicating the first quantity of the first product has been reserved; and
    in response to either a request being received from the graphical user interface to cancel the allocation request or the modified first software object being closed without having been saved, sending an asynchronous compensate message to the inventory processing component requesting the first quantity of the first product be unreserved and placed back into available stock in the consignment stock.

2. The system of claim 1, wherein the operations further comprise:
    creating a second software object;
    receiving, from a graphical user interface, a request to add a second allocation request to the second software object, the allocation request requesting allocation of a second quantity of a second product from consignment stock;
    modifying the second software object to add the second allocation request;
    prior to saving the modified second software object, sending a synchronous request message to the inventory processing component requesting the second quantity of the second product be reserved and temporarily removed from available stock in the consignment stock;
    receiving a synchronous response message indicating the second quantity of the second product has been reserved; and
    in response to the second software object being saved, sending an asynchronous confirmation message to the inventory processing component requesting that the second quantity of the second product be formally allocated and permanently removed from available stock in the consignment stock.

3. The system of claim 2, wherein the operations further comprise:
    creating a third software object;
    receiving, from a graphical user interface, a request to add a third allocation request to the third software object, the allocation request requesting allocation of a third quantity of the second product from consignment stock;
    modifying the third software object to add the third allocation request;
    prior to saving the modified third software object, sending a synchronous request message to the inventory processing component requesting the third quantity of the second product be reserved and temporarily removed from available stock in the consignment stock;
    receiving a synchronous response message indicating the second quantity of the second product has not been reserved due to insufficient available inventory in the consignment stock; and generating a message in the graphical user interface indicating that the allocation request requesting allocation of the third quantity of the second product could not be processed.

4. The system of claim 1, wherein the inventory processing component further:
  determines whether the allocation request requests allocation of specific serial numbers of the first product; and
  in response to a determination that the allocation request requests allocation of specific serial numbers of the first product, calls a separate serial inventory component to attempt to temporarily reserve the specific serial numbers of the first product.

5. The system of claim 4, wherein the asynchronous compensate message includes a request to unreserved the specific serial numbers of the first product that had been temporarily reserved.

6. The system of claim 1, wherein the software object is a sales order object.

7. The system of claim 1, wherein the operations are performed at an order processing process component in a consumer deployment unit.

8. A method comprising:
  requesting stock be sent by sending a consignment fill-up document to a stock provider, the stock becoming consignment stock when sent from the stock provider to a stock receiver;
  creating a first software object;
  receiving, from a graphical user interface, a request to add a first allocation request to the first software object, the allocation request requesting allocation of a first quantity of a first product from consignment stock;
  modifying the first software object to reflect the first allocation request, in response to detection of the request from the graphical user interface;
  prior to saving the modified first software object, sending a synchronous request message to an inventory processing component requesting the first quantity of the first product be reserved and temporarily removed from available stock in the consignment stock;
  receiving a synchronous response message indicating the first quantity of the first product has been reserved; and
  in response to either a request being received from the graphical user interface to cancel the allocation request or the modified first software object being closed without having been saved, sending an asynchronous compensate message to the inventory processing component requesting the first quantity of the first product be unreserved and placed back into available stock in the consignment stock.

9. The method of claim 8, further comprising:
  creating a second software object;
  receiving, from a graphical user interface, a request to add a second allocation request to the second software object, the allocation request requesting allocation of a second quantity of a second product from consignment stock;
  modifying the second software object to add the second allocation request;
  prior to saving the modified second software object, sending a synchronous request message to the inventory processing component requesting the second quantity of the second product be reserved and temporarily removed from available stock in the consignment stock;
  receiving a synchronous response message indicating the second quantity of the second product has been reserved; and
  in response to the second software object being saved, sending an asynchronous confirmation message to the inventory processing component requesting that the second quantity of the second product be formally allocated and permanently removed from available stock in the consignment stock.

10. The method of claim 9, further comprising:
  creating a third software object;
  receiving, from a graphical user interface, a request to add a third allocation request to the third software object, the allocation request requesting allocation of a third quantity of the second product from consignment stock;
  modifying the third software object to add the third allocation request;
  prior to saving the modified third software object, sending a synchronous request message to the inventory processing component requesting the third quantity of the second product be reserved and temporarily removed from available stock in the consignment stock;
  receiving a synchronous response message indicating the second quantity of the second product has not been reserved due to insufficient available inventory in the consignment stock; and
  generating a message in the graphical user interface indicating that the allocation request requesting allocation of the third quantity of the second product could not be processed.

11. The method of claim 8, wherein the inventory processing component further:
  determines whether the allocation request requests allocation of specific serial numbers of the first product; and
  in response to a determination that the allocation request requests allocation of specific serial numbers of the first product, calls a separate serial inventory component to attempt to temporarily reserve the specific serial numbers of the first product.

12. The method of claim 11, wherein the asynchronous compensate message includes a request to unreserved the specific serial numbers of the first product that had been temporarily reserved.

13. The method of claim 8, wherein the software object is a sales order object.

14. The method of claim 8, wherein operations are performed at an order processing process component in a consumer deployment unit.

15. A non-transitory machine-readable medium storing instructions which, when executed by one or more processors, cause the one or more processors to perform operations comprising:
  requesting stock be sent by sending a consignment fill-up document to a stock provider, the stock becoming consignment stock when sent from the stock provider to a stock receiver;
  creating a first software object;
  receiving, from a graphical user interface, a request to add a first allocation request to the first software object, the allocation request requesting allocation of a first quantity of a first product from consignment stock;
  modifying the first software object to reflect the first allocation request, in response to detection of the request from the graphical user interface;
  prior to saving the modified first software object, sending a synchronous request message to an inventory processing component requesting the first quantity of the first product be reserved and temporarily removed from available stock in the consignment stock;

receiving a synchronous response message indicating the first quantity of the first product has been reserved; and in response to either a request being received from the graphical user interface to cancel the allocation request or the modified first software object being closed without having been saved, sending an asynchronous compensate message to the inventory processing component requesting the first quantity of the first product be unreserved and placed back into available stock in the consignment stock.

16. The non-transitory machine-readable medium of claim 15, wherein the operations further comprise:

creating a second software object;

receiving, from a graphical user interface, a request to add a second allocation request to the second software object, the allocation request requesting allocation of a second quantity of a second product from consignment stock;

modifying the second software object to add the second allocation request;

prior to saving the modified second software object, sending a synchronous request message to the inventory processing component requesting the second quantity of the second product be reserved and temporarily removed from available stock in the consignment stock;

receiving a synchronous response message indicating the second quantity of the second product has been reserved; and in response to the second software object being saved, sending an asynchronous confirmation message to the inventory processing component requesting that the second quantity of the second product be formally allocated and permanently removed from available stock in the consignment stock.

17. The non-transitory machine-readable medium of claim 16, wherein the operations further comprise:

creating a third software object;

receiving, from a graphical user interface, a request to add a third allocation request to the third software object, the allocation request requesting allocation of a third quantity of the second product from consignment stock;

modifying the third software object to add the third allocation request;

prior to saving the modified third software object, sending a synchronous request message to the inventory processing component requesting the third quantity of the second product be reserved and temporarily removed from available stock in the consignment stock;

receiving a synchronous response message indicating the second quantity of the second product has not been reserved due to insufficient available inventory in the consignment stock; and generating a message in the graphical user interface indicating that the allocation request requesting allocation of the third quantity of the second product could not be processed.

18. The non-transitory machine-readable medium of claim 15, wherein the inventory processing component further:

determines whether the allocation request requests allocation of specific serial numbers of the first product; and in response to a determination that the allocation request requests allocation of specific serial numbers of the first product, calls a separate serial inventory component to attempt to temporarily reserve the specific serial numbers of the first product.

19. The non-transitory machine-readable medium of claim 18, wherein the asynchronous compensate message includes a request to unreserved the specific serial numbers of the first product that had been temporarily reserved.

20. The non-transitory machine-readable medium of claim 15, wherein the software object is a sales order object.

* * * * *